Patented Sept. 13, 1932

1,877,130

UNITED STATES PATENT OFFICE

ROWLAND HILL AND ERIC EVERARD WALKER, OF BLACKLEY, MANCHESTER, ENGLAND

RESINOUS COMPOSITION AND PROCESS OF MAKING SAME

No Drawing. Application filed March 4, 1930, Serial No. 433,169, and in Great Britain January 25, 1929.

This invention relates to resinous compositions and lacquers and comprises a means for producing new resins and lacquers therefrom, having particularly valuable properties.

It is well known that resinous condensation products of urea and formaldehyde suffer from certain disadvantages. For instance, they are not very flexible when hardened and in their soluble state are but sparingly soluble in the more common organic solvents such as acetone, toluene and the like. They possess, however, the valuable properties of being colorless and of hardening rapidly under the influence of heat.

On the other hand, certain polyhydric alcohol-polybasic acid resins, while generally possessing the desirable properties of toughness, flexibility and ready solubility in numerous organic solvents, are deficient in that they harden slowly under the action of heat unless modified by certain additions such as phenol-formaldehyde resoles or drying oil fatty acids. Such additions, however, degrade or darken the color of the resulting resin and, while the addition of a drying oil or drying oil fatty acid is effective in some cases, in other cases such resins and drying oil or drying oil fatty acid do not harden as rapidly or as thoroughly as is desirable, for instance, when applied to surfaces of certain rubber compositions.

We have now invented means for the production of a new class of resin, and of varnishes or lacquers therefrom, wherein are associated the desirable properties of polyhydric alcohol-polybasic acid resins, such as toughness and flexibility, with the property of rapid hardening possessed by resins of the urea-formaldehyde type. At the same time, neither the color nor the fastness to light is deleteriously affected by the action of one another of the components from which our new resins are produced. Moreover, our new resins possess the important property of hardening rapidly even on surfaces which inhibit the hardening of a polyhydric alcohol-polybasic acid resin containing a drying oil component in the absence of urea-formaldehyde condensation products.

Our invention thus comprises the manufacture of new resins by the union of a polyhydric alcohol-polybasic acid resin with a urea- or thiourea-formaldehyde condensation product, or with a mixture of substances which will yield such condensation product, the union being brought about by interaction, aided by heat, in a suitable solvent or mixture of solvents. In carrying out our invention we do not confine ourselves to any particular mode of bringing about the union of the reacting substances. We may, for example, heat an alcoholic solution of a polyhydric alcohol-polybasic acid resin and a urea- or thiourea-formaldehyde condensation product, or we may dissolve the component substances in the solvent at once or by portions, together or separately, before or during the heating, or, more specifically, we may perform the operation in any such manner as is illustrated by the examples given below. As solvents which may be used in accordance with our invention we may mention ethylene chlorohydrin, dichlorohydrin, glycol monoethyl ether, butyl alcohol, cyclohexanol.

That chemical combination between the components occurs, may readily be shown by adding to 95 parts of a molten polyhydric alcohol-polybasic acid resin at about 100–120° C., 5 parts of urea-formaldehyde condensation product, e. g. dimethylolurea. The temperature rises and an infusible insoluble gel is formed with great rapidity. Moreover, the degree of hardening and the increase in the rate of hardening of lacquers etc. produced by the addition of even so small a proportion as 5% of urea-formaldehyde condensation product to a polyhydric alcohol-polybasic acid resin is very great and this would not be the case were only a physical mixture or blend of the two formed. It is to be understood that, as in the case of the simpler polyhydric alcohol-polybasic acid resins, our new resins may exist in a soluble and an insoluble or hardened form, the soluble form being transformed into the insoluble or hardened form by the action of heat or other agencies.

In selecting a polyhydric alcohol-polybasic acid resin for the production of one of our new resins, regard must be had to the purpose for which the resin is intended. For instance, if hardness is the chief consideration, then a straight glycerol phthalic anhydride condensation product may be employed, while a castor oil modified polyhydric alcohol-polybasic acid resin yields lacquers which are both light in color and very flexible. If it is desired to make a resin compatible with nitrocellulose ester the proportion of polyhydric alcohol-polybasic acid resin to urea formaldehyde condensation product should be suitably adjusted, e. g. 70 parts of polyhydric alcohol-polybasic acid resin to 30 parts dimethylolurea.

If desired, a drying oil fatty acid may be added to the components from which by interaction our new resins are formed, but in this case it will be understood that, while the superior hardening property of our new resins remains in evidence, there may be a degradation of color due to the oil or fatty acid.

In preparing our new resins the acidity of the reacting polyhydric alcohol-polybasic acid resin should be regulated according to the result desired. For transparent lacquers the acidity must not be too high and may be modified by addition of alkali as explained, for instance, in Examples 1 and 4. The stability of the finished resin may be considerably reduced if the acidity is marked, but for such purposes as are indicated below we have found that improved products are obtained when we incorporate a small proportion of an acid or an acid-producing substance, the proportion added depending, inter alia, on the strength of the acid, as is indicated below. In this way our resins are caused to harden rapidly even at the ordinary room temperature. It is thus a valuable feature of our invention that lacquers are produced containing resins which are hardened either by a heat treatment, or at the ordinary temperature by the catalytic action of added acid or acid producing substance. Thus, we add to the lacquers prepared from our new resins the requisite amount of acid catalyst, which may be from 0.05% upwards according to the nature of the catalyst employed. The lacquer may then be applied to a suitable support either by dipping, spraying or brushing, and allowed to dry at room temperature, or stoved if desired. Transparent hard adherent flexible virtually colorless films are obtained thereby, possessing a high gloss. Inert coloring matter or pigments may be used if desired.

The acid catalyzed resin may also be used in admixture with other materials such as cellulose esters and ethers with which it is compatible. We have made the important discovery that in such cases, the composite film at room temperature becomes rapidly insoluble in solvents. This facilitates the application of a second coat of lacquer, particularly in the case of brushing compositions, since the first coat, being insoluble, does not lift or dissolve on application of the next coat.

The catalytic efficiencies of acids and acid producing substances vary; in general we find that strong acids and acid producing substances are more marked in their action than weak acids. The following have given goods results:—sulphuric acid, sodium hydrogen sulphate, chlorosulphonic acid, sulphuryl chloride, benzenesulphonic acid, hydrochloric acid, p-toluene-sulphonic chloride, trichloro-acetic acid, tartaric acid, boric acid and malic acid. We do not however restrict ourselves to these substances. In certain cases, we find it advantageous to use mixtures of such acids or acid producing substances.

The uses to which our new resins may be put are numerous. Apart from the preparation of lacquers of various kinds, in which an acid catalyst may or may not be present, we may mention that our resins, with or without the addition of the acid catalyst, may be used in the bonding of mica or other laminated material, the preparation of moulding powders and compositions (with or without the addition of fillers, such as wood meal, casein, flour, mineral matter, etc.), and the like.

Our invention is illustrated, but not limited, by the following examples, in which the parts are by weight.

*Example 1*

148 parts of phthalic anhydride, 62 parts of glycerol, and 150 parts of castor oil are heated together in a vessel fitted with a stirrer and thermometer at 190–200° C. for ¾ hour. A current of an inert gas such as carbon dioxide or nitrogen is passed through the mixture during the reaction. After cooling rapidly, there is obtained a pale yellow, tough, flexible moderately hard resin, soluble in ketones, esters, hydrocarbons, and hot alcoholic solvents.

14 parts of the polyhydric alcohol-polybasic acid resin so prepared are dissolved in 14 parts of butyl alcohol and the hydrogen ion concentration adjusted to $10^{-6}$ by the addition of alcoholic caustic potash solution. The necessary quantity of potash may be determined by diluting a small test portion of the solution with about 10 times its volume of distilled water, filtering off the precipitate formed, adding to the filtrate a suitable indicator and titrating with alkali of known strength. Hereupon 3 parts of urea are added, heat applied, and when solution is complete, 3 parts of paraformaldehyde are introduced into the hot solution. The mixture is refluxed for a short time until the paraformaldehyde has completely reacted. The whole is diluted with 10 parts solvent naphtha, and after filtering from traces of suspended matter, the new lacquer is obtained as a clear pale yellow liquid which gives transparent colorless coatings after baking, possessing good adhesion, flexibility, hardness and toughness. If necessary, the new resin may be isolated by evaporation of the solvent in vacuo at a low temperature. It is compatible with nitrocellulose, and may be used as a component of lacquers containing this material.

Example 2

92 parts of phthalic anhydride, 46 parts of glycerol, and 72 parts of linseed oil fatty acids are heated at a temperature of 180–190° C. in an open vessel, fitted with a stirrer and thermometer. Finally, the temperature may be raised to 220–230° C. and the reaction concluded by heating for about 1½ hours. When cold, the resin is moderately hard, tough and pliable, and is pale brown in color.

14 parts of the modified polyhydric alcohol-polybasic acid resin so prepared are dissolved in 15 parts of butyl alcohol, and 6 parts of dimethylol urea added. The mixture is refluxed for about 3½ hours, when the dimethylol urea has completely reacted. The whole is then diluted with 15 parts of solvent naphtha and filtered from traces of insoluble matter. The lacquer is brown in color. When applied to articles and baked, transparent coatings, golden in color, are obtained; they possess extraordinary hardness, toughness, flexibility and adhesion.

Example 3

10 parts of polyhydric alcohol-polybasic acid resin prepared according to Example 1 are dissolved in 20 parts of glycol monoethyl ether, 10 parts dimethylol urea are added, and the mixture heated. The dimethylol urea dissolves after about 10 minutes. Heating is continued for 30 minutes in all when 7.5 parts solvent-naphtha and 7.5 parts methylated spirits are added. After removing traces of suspended matter, the lacquer may be applied to suitable articles and baked as in the preceding example. A very hard tough coating is obtained, which possesses good adhesion and flexibility. It is highly resistant to water.

Example 4

14 parts polyhydric alcohol-polybasic acid prepared according to Example 1 are dissolved in 20 parts of glycol monoethyl ether, 6 parts dimethylol urea are added, and the mixture heated. After about 5 minutes, the dimethylol urea dissolves. Heating is continued for 30 minutes, when 10 parts of solvent-naphtha are added. The hydrogen ion concentration is then adjusted to $10^{-7}$ by the addition of alcoholic caustic potash solution. Suspended matter is removed by filtration, and the new resin may be obtained on evaporation of the solvent in vacuo at a low temperature.

Example 5

100 parts of the polyhydric alcohol-polybasic acid resin prepared as described in Example 1 are dissolved in 200 parts of glycol monoethyl ether and 100 parts of dimethylolurea is added. The mixture is refluxed for ½ hour when the dimethylol urea has substantially reacted. 85 parts methylated spirits and 85 parts toluene are then added, and the lacquer clarified if necessary by filtration. It is then treated in either of the following ways:—

(I) 60 parts of the lacquer is treated with 0.42 parts of 10% solution of sulphuric acid dissolved in 2 parts glycol monoethyl ether, 1 part toluene and 1 part methylated spirits. The lacquer dries rapidly at ordinary temperature to a transparent and colorless hard adherent flexible film when applied to a suitable support by brushing, spraying, or dipping.

(II) To 40 parts of the lacquer are added 0.87 parts of a 32% solution of benzenesulphonic acid. When applied to metal, wood, etc. the lacquer dries rapidly at ordinary temperature as in (I).

(III) 45 parts of the lacquer are treated with 7 parts of a 10% solution of tartaric acid (2 parts) and boric acid (1 part) dissolved in 2 parts glycol ethyl ether, 1 part methylated spirits and 1 part toluene.

(IV) 30 parts of a 30% nitrocellulose dope solution are mixed with 18 parts of the lacquer, and diluted to 15% strength by addition of a nitrocellulose mixed solvent. 2.7 parts of 10% sulphuric acid solution are then added. The film dries rapidly to a transparent, flexible, adherent coating which becomes insoluble in nitrocellulose solvents about 1¼ hours after application at room temperature.

By the term "methylated spirits", as used herein, we mean ethyl alcohol which has been denatured with methyl alcohol.

Having now particularly described and ascertained the nature of our said invention, and in what manner the same is to be performed, we declare that what we claim is:—

1. The process of making rapid-hardening resinous compositions which comprises heating together a resin of the polyhydric alcohol-organic polybasic acid type and a urea-formaldehyde condensation product in an alcoholic solvent for the polyhydric alcohol-organic polybasic acid resin.

2. The process of making rapid-hardening resinous compositions which comprises heating together a resin of the polyhydric alcohol-organic polybasic acid type with substances capable of yielding a urea-formaldehyde condensation product, the union of the reacting substances being brought about in an alcoholic solvent for the polyhydric alcohol-organic polybasic acid resin.

3. The process of making a rapid-hardening resinous composition which comprises heating, in butyl alcohol, urea, and paraformaldehyde, with the condensation product obtained by interaction of glycerol, phthalic anhydride, and castor-oil.

4. The process of making a rapid-hardening resinous composition which comprises heating, in butyl alcohol, dimethylolurea with the condensation product of glycerol, phthalic anhydride and linseed oil.

5. The process of making a rapid-hardening resinous composition which comprises heating, in glycol monoethyl ether, dimethylolurea with the condensation product of glycerol, phthalic anhydride, and castor oil.

6. The process of making a resinous composition which hardens in the cold comprising the addition of an acidic catalytic substance to a resinous composition obtained by heating together a resin of the polyhydric alcohol-organic polybasic acid type and a urea- or thiourea-formaldehyde condensation product in an alcoholic solvent for the polyhydric alcohol-organic polybasic acid resin.

7. The process of making a resinous composition which hardens in the cold comprising the addition of an acidic catalytic substance to a resinous composition obtained by heating together a resin of the polyhydric alcohol-organic polybasic acid type with substances capable of yielding a urea-formaldehyde condensation product, the union of the reacting substances being brought about in an alcoholic solvent for the polyhydric alcohol-organic polybasic acid resin.

8. A rapid-hardening resinous composition such as can be obtained by heating together a resin of the polyhydric alcohol-organic polybasic acid type and a urea-formaldehyde condensation product in an alcoholic solvent for the polyhydric alcohol-organic polybasic acid resins.

9. A rapid-hardening resinous composition such as can be obtained by heating together a resin of the polydydric alcohol-organic polybasic acid type with substances capable of yielding a urea-formaldehyde condensation product, the union of the reacting substances being brought about in an alcoholic solvent for the polyhydric alcohol-organic polybasic acid resin.

10. A rapid-hardening resinous polyhydric alcohol-organic polybasic acid-urea-formaldehyde condensation product such as can be obtained by condensation in an alcoholic solvent for the polyhydric alcohol-organic polybasic acid resin.

11. A resinous composition which hardens in the cold such as can be obtained by adding an acidic catalyst to a polyhydric alcohol-organic polybasic acid-urea-formaldehyde condensation product obtained by condensation in an alcoholic solvent for the polyhydric alcohol-organic polybasic acid resin.

12. A resinous composition which hardens in the cold such as can be obtained by adding sulphuric acid to a polyhydric alcohol-organic polybasic acid-urea-formaldehyde condensation product obtained by condensation in an alcoholic solvent for the polyhydric alcohol-organic polybasic acid resin.

13. A resinous composition which hardens in the cold such as can be obtained by adding tartaric acid and boric acid to a polyhydric alcohol-organic polybasic acid-urea-formaldehyde condensation product obtained by condensation in an alcoholic solvent for the polyhydric alcohol-organic polybasic acid resin.

In testimony whereof we affix our signatures.

ROWLAND HILL.
ERIC EVERARD WALKER.

CERTIFICATE OF CORRECTION.

Patent No. 1,877,130.  September 13, 1932.

ROWLAND HILL ET AL.

It is hereby certified that error appears in the printed specification of the above numbered patent requiring correction as follows: Page 2, line 104, for "¾ hour" read 3-4 hours; and that the said Letters Patent should be read with this correction therein that the same may conform to the record of the case in the Patent Office.

Signed and sealed this 22nd day of November A. D. 1932.

(Seal)

M. J. Moore,
Acting Commissioner of Patents.